Sept. 24, 1957 H. NELSON 2,807,561

PROCESS OF FUSING MATERIALS TO SILICON

Filed Nov. 2, 1953

INVENTOR.
Herbert Nelson

BY J. C. Whittaker
ATTORNEY 2,807,561

PROCESS OF FUSING MATERIALS TO SILICON

Herbert Nelson, Bloomfield, N. J., assignor to Radio Corporation of America, a corporation of Delaware Application November 2, 1953, Serial No. 389,514

11 Claims. (Cl. 148—1.5)

This invention relates to improved methods of fusing materials to silicon and more particularly to improved methods of alloying and fusing metals to relatively pure silicon bodies.

Silicon is a semi-conductive material which is useful in many different kinds of semi-conductor devices. In making semi-conductor devices utilizing silicon it is often desirable to fuse a metal to a silicon body to provide an electrical connection to the body. It is also often desirable to alloy and to diffuse a conductivity type-determining impurity-yielding material into a silicon body to provide a *p-n* rectifying barrier or junction within the body.

Techniques have been previously developed for alloying and fusing materials to germanium bodies to make semi-conductor devices utilizing germanium. However, it has proven relatively difficult to alloy or to fuse materials to silicon. It is believed that the difficulties encountered when making connections to silicon are due primarily to a relatively thin insulating film of silicon oxide which is present on the surface of silicon bodies. It is thought that a silicon oxide film prevents an alloying or fusing material from contacting and wetting a silicon surface. Techniques such as etching a silicon surface in hydrofluoric acid to dissolve the oxide film prior to alloying or fusing have been suggested but it has been found to be relatively difficult to prevent the formation of a new oxide film before or during a fusing process.

Accordingly, it is an object of the instant invention to provide improved methods of fusing metals to silicon bodies.

Another object is to provide improved methods of dissolving oxide films from a silicon surface at elevated temperatures.

Another object is to provide improved methods of making semi-conductor devices utilizing silicon.

Another object is to provide improved methods of making a *p-n* rectifying junction in a silicon body.

According to the instant invention a metal which forms an alloy with silicon, said alloy having a melting point below the melting point of silicon, may be readily alloyed or fused to silicon without melting the silicon. A flux consisting of fluoride salts is applied to the area of contact between the alloying metal and the silicon. The flux operates to dissolve a silicon oxide film at elevated temperatures, thus permitting the alloying metal to come into intimate contact with and to fuse to the silicon.

The invention will be more fully described in connection with the drawing of which:

Similar reference characters are applied to similar elements throughout the drawing.

Figure 1:
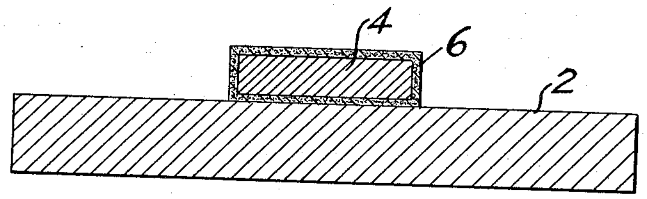
Figure 1 is a schematic, cross-sectional, elevational view of a silicon wafer and a metal pellet prepared for alloying.

According to a preferred embodiment of the instant invention a semi-conductor device may be made utilizing a wafer of semi-conductive silicon which may, for example, have p-type conductivity. Referring now to Figure 1, a pellet 4 of an alloy comprising by weight about 25% antimony and 75% gold is immersed for a few seconds in concentrated hydrofluoric acid. The alloy reacts with the hydrofluoric acid and produces a coating 5 comprising one or more fluoride salts on the surface of the pellet. The pellet is removed from the acid and allowed to dry. It is then placed on the surface of a wafer 2 of p-type semi-conductive silicon. The wafer and pellet are heated together in contact at about 600° C. for about two minutes and cooled slowly. The fluoride film on the pellet aids in dissolving any oxide film that may exist on the surface of the wafer within the area of contact between the pellet and the wafer. The pellet is thus enabled to wet the surface of the silicon rapidly and evenly and to alloy with the silicon to produce the device shown in Figure 2.

Figure 2:
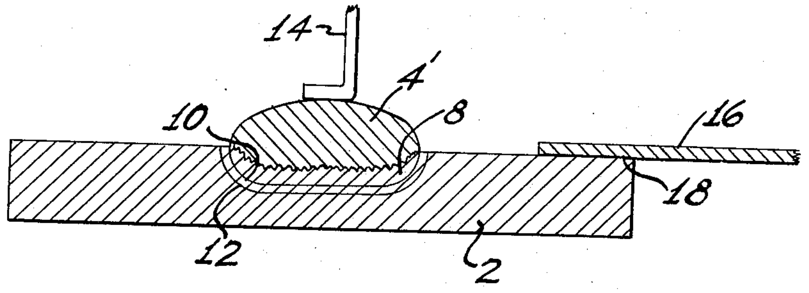
Figure 2 is a schematic, cross-sectional, elevational view of a device produced according to the invention.

Figure 2 illustrates a device produced according to the preferred embodiment of the invention. The device shown is the result of the process heretofore described. It includes the silicon wafer 2 to which there is fused an electrode 4'. The electrode is formed from the pellet 4 of Figure 1 by the alloying process, during which a portion of the silicon wafer is dissolved in the electrode. The deepest point of penetration of the electrode is called the alloy front and is shown by the line 10. A *p-n* rectifying junction 12 is formed adjacent the alloy front. During cooling, a portion of the silicon that was dissolved into the molten pellet is recrystallized upon the wafer to form a recrystallized region 8 relatively rich in antimony and gold. Electrical leads 14 and 16 may be attached to the electrode and to the wafer respectively to incorporate the device in a circuit. The device may be conventionally etched, mounted and potted.

Although the practice of the preferred embodiment of the invention has been described with reference to a pellet material consisting of antimony and gold, it should be understood that it is equally effective with other pellet materials such as alloys of tin or gold with antimony, arsenic or bismuth, and when alloying or fusing metals generally to silicon. The practice of the invention is particularly advantageous when it is desired to alloy or to fuse a metal to silicon at a temperature below the melting point of silicon. At temperatures above the melting point of silicon the silicon itself melts and no longer supports the oxide film upon its surface. Thus, if the silicon is melted, the continuity of the oxide film is destroyed by the removal of its support, and an alloying metal is usually able to penetrate the film and to contact the molten silicon even without the use of a silicon oxide film-dissolving agent.

According to a second embodiment of the instant invention a fluoride flux may be provided intimately intermixed with an alloying material. In certain instances, as, for example, when it is desired to fuse relatively pure antimony or gold to silicon, dipping a pellet of the material into hydrofluoric acid does not appear to provide satisfactory results. It is thought that a fluoride salt film is formed having insufficient thickness to react with the complete thickness of a silicon oxide film, or it may be that certain fluoride salts are excessively stable so that they do not react with silicon oxide at fusing temperatures below the melting point of silicon. In these instances the material to be alloyed or fused to silicon may be pulverized and mixed with 5% to 20% by weight, preferably about 10%, of a powdered fluoride such as antimony tri-fluoride or stannic fluoride. The mixed powders may be molded by compression into pellets of a desired shape and size. The pellets may be fused to a silicon body in an exactly similar manner as the treated pellets heretofore described.

In general, the effectiveness of the practice of the invention has been demonstrated with respect to alloying the following materials to silicon at temperatures substantially below the melting point of silicon: metals of the boron group, phosphorus, arsenic, antimony, bismuth, copper, silver, zinc, cadmium and alloys of these elements. The practice of the invention includes making non-rectifying connections to silicon. Such a connection may be made, for example, by fusing tin to silicon utilizing a tin fluoride flux according to the invention. Broadly, an important feature of the invention comprises the use of a flux consisting of fluoride salts to aid in fusing metals and alloys to silicon.

The exact chemical reaction that takes place in the practice of the invention is not known. It is believed, however, that silicon is relatively more reactive with fluorine than are many alloying materials and that in instances where silicon is less reactive, the volatility of silicon fluoride makes the reaction that occurs unidirectional, since silicon fluoride is continuously driven off.

Broadly, a flux according to the invention comprises a salt of fluorine which reacts with silicon oxide at elevated temperatures to produce a volatile product. The term fluoride as used in this application is intended to refer to at least all those salts which are the reaction products of hydrofluoric acid and metals, and is not intended to be strictly limited to salts which provide $F^-$ ions in solutions.

What is claimed is:

1. A method of fusing a conductivity type-determining material to a silicon surface bearing a film of silicon oxide, said method comprising placing a body of said material in contact with said film, introducing a fluoride salt to said contacted film, and heating said material, said fluoride salt and said silicon surface together to a temperature below the melting point of silicon and at least as high as the melting point of an alloy of said material and silicon.

2. The method according to claim 1 in which said material comprises an alloy of antimony and gold.

3. The method according to claim 1 in which said fluoride salt is the fluoride salt of said material and is distributed upon the surface of said body.

4. The method according to claim 1 in which said fluoride salt is distributed throughout said body of said material.

5. The method according to claim 3 in which said fluoride salt is produced by immersing said body in hydrofluoric acid.

6. In a method of making a semi-conductor device comprising alloying a conductivity type-determining material into a body of semi-conductive silicon bearing a film of silicon oxide the improvement comprising providing a fluoride salt in contact with said film adjacent the region of said alloying.

7. In a method of fusing a conductivity type-determining material to silicon bearing an oxide film by heating said material together with silicon to a temperature below the melting point of silicon, the improvement comprising the use of a flux consisting of fluorides in contact with said oxide film.

8. A method of fusing a material to a silicon surface comprising the steps of forming a shaped body by molding a mixture of said material and 5% to 20% by weight of a fluoride salt into a shaped body, and heating said body in contact with said silicon surface to a temperature below the melting point of silicon and at least as high as the melting point of an alloy of said material and silicon.

9. The method according to claim 8 in which said fluoride salt is antimony trifluoride.

10. A method of fusing a material to a silicon surface bearing a film of silicon oxide, said method comprising immersing a body of said material in hydrofluoric acid, extracting said body from said acid, placing said body upon said silicon surface, and heating said body and said surface together to a temperature at least as high as the melting point of an alloy of said material and silicon.

11. The method according to claim 10 in which said material is an alloy comprising about 25% antimony and 75% gold, and said temperature is about 600° C.

References Cited in the file of this patent

UNITED STATES PATENTS

| | | |
|---|---|---|
| 2,194,200 | Cohn | Mar. 19, 1940 |
| 2,583,681 | Brittain | Jan. 29, 1952 |

OTHER REFERENCES

Fox: Abstract of Application, Serial No. 604,013, publ. in O. G. vol. 628, page 1200, Nov. 22, 1949.